Aug. 15, 1967  J. M. BROOKS  3,335,733
SMOKE FILTER
Filed March 15, 1965
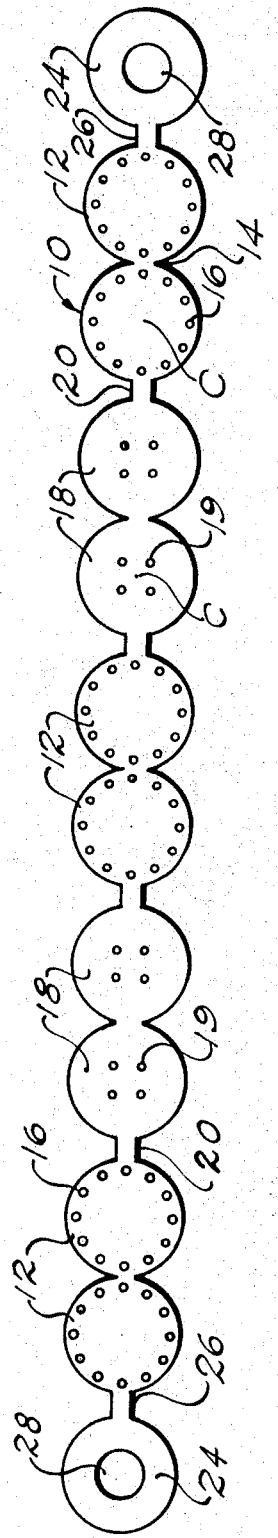
FIG. 1
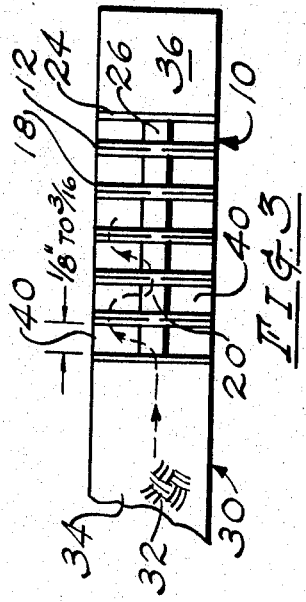
FIG. 3
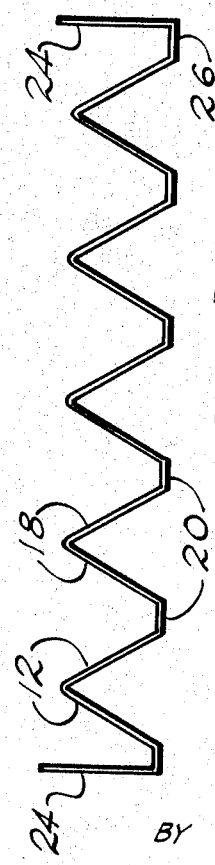
FIG. 2
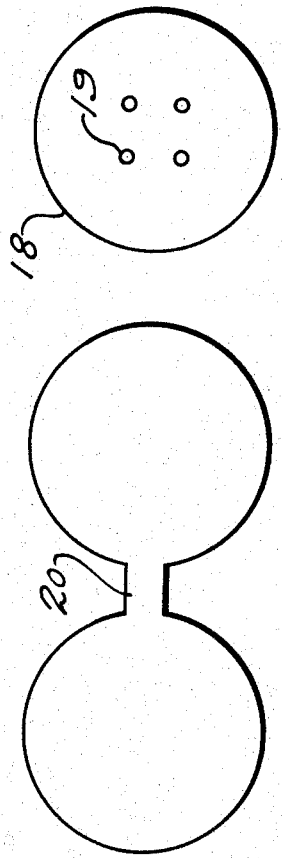
FIG. 6
FIG. 5
FIG. 4
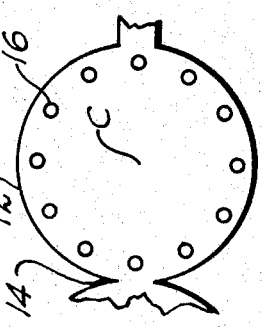
INVENTOR
JOHN M. BROOKS
BY
ATTORNEY

United States Patent Office 3,335,733
Patented Aug. 15, 1967

3,335,733
SMOKE FILTER
John M. Brooks, P.O. Box 65A, Rte. 3,
Douglasville, Ga. 30134
Filed Mar. 15, 1965, Ser. No. 439,737
10 Claims. (Cl. 131—261)

This invention relates to a smoke filter and particularly to a filter for tobacco smokers and especially to a filter which may be used on the tip of a cigarette.

There are many filter arrangements for cigarettes, pipes and the like. Some of these filters are quite complex with combinations of cellulose and other fibrous materials as well as different types of paper. The effectiveness of a filter not only involves how much of the impurities and other smoke-borne particles are removed but also how effective the filter is in removing certain objectionable tars, particles and other things but at the same time leaving a decent smoke. Cost is another factor as well as mass assembly.

The present invention relates to a filter which is especially applicable to the tip of a cigarette and which may be made in a flat, chain like form which is subsequently changed into a co-axial relationship of spaced filter plates having filter openings therein.

Generally described, the present invention is adapted especially to be manufactured from a flat strip of filter material such as porous paper and the like by cutting or stamping a series of circular members connected by small connecting portions at their periphery and being substantially symmetrical along a longitudinal line. The space between the adjoining circular portions or discs is pre-determined so that in final folded condition the ultimate space between discs is determined by the length of the connecting piece. In one form, there are three general types of substantially equal size filter discs, there being one with a series of small, spaced holes near the outer periphery or edge, another pair with a few holes grouped near the center and a third type of disc which is primarily for the first and last position having an enlarged central opening. Folding of the filter strip to bring the respective discs in accordion-like arrangement and to place successive pairs of like disc in abutment results in a circular filter having a small, pre-determined space between each of the sets of filter discs. This composite, cylindrical-like filter may then be incorporated in the tip of a cigarette and overwrapped with non-porous paper whereby the smoke is drawn from the cigarette through the openings in the filter alone and through the outlet into the mouth.

A primary object of this invention is to provide a filter having a series of spaced filter elements with staggered openings forming an offset baffle arrangement to direct the smoke through spaced discs.

Another object of the present invention is to provide a filter device which may be manufactured from a flat strip of filter material forming adjacent filter members connected but ultimately positioned in spaced relation.

Still another object of the present invention is to provide a filter arrangement having a plurality of spaced disc members at a pre-determined space and said disc having outlets at different positions with respect to the center of the filter whereby the smoke is caused to travel in a pattern other than a straight line.

Other and further objects and advantages of my invention will become apparent upon reading the following specification taken in conjunction with the accompanying drawings, in which:

FIG. 1 is a plan view of the filter arrangement in substantial two-dimension condition as made from a flat strip of filter material.

FIG. 2 is a side elevation view of an intermediate step of the evolution of folding or completing the filter into final position.

FIG. 3 is a view of the completed and assembled filter inside of a typical cigarette tip with the overwrap removed.

FIG. 4 is a enlarged plan view of one of the filter discs.

FIG. 5 is a plan view of a pair of adjacent filter discs shown in enlargement.

FIG. 6 is an enlarged plan view of one of the other filter discs.

Referring initially to FIG. 1, and thence to other figures of the drawings and back and forth as the specification unfolds, the elongated member shown in FIG. 1 is generally identified by reference numeral 10 and is referred to as the filter blank which is adapted to be manufactured from a flat strip of filter material such as hard paper. The filter blank 10 is die-cut or otherwise shaped to form a series of adjacent filter disc members, arranged in pairs according to their identical construction in the present FIG. 1.

The first pair of discs 12 are circular members closely joined at one peripheral junction 14 and having a series of small openings 16 arranged in spaced arcuate relation about a circle near the periphery of the disc 12 and spaced from the center C.

The next set of discs 18 are spaced from the previous set of discs 12 by means of a longer connecting member or strip 20, which determines the ultimate space between the pairs of discs 12, 18, and discs 18, in the present embodiment, provided with a series of four small openings 19 arranged in a square formation about the center C. The openings in all of the disc members are very small and in the approximate neighborhood of 1/32 inch. While exact size is not critical to thousandths or even hundredths of an inch, the holes are in this general size and therefore very small.

While in the present embodiment discs 12 and 18 constitute the only adjacent adjoining pairs of discs, and there being three sets of discs 12 spaced apart by two sets of discs 18 as shown in FIG. 1, there is a third disc 24 which is connected to the first set 12 by a joining member 26 and disc 24 is the first disc on the filter. The last disc on the filter is an identical disc 24 also connected by a member 26 to the last set 12. Disc members 24 have one large, central opening 28 therein. This opening is preferably circular as shown in the drawings.

To complete the construction of the filter to operable position, it is folded through an evolution of accordion-like folding procedure as shown in the intermediate step of FIG. 2 whereby the pairs of identical discs 12, 18 fold against each other placing the holes 16 thereof in aligned position and in effect making one solid disc of twice the thickness as shown in FIG. 3. The longer connecting portion 20, 26 between the alternate pairs of discs, 12, 18 cause the disc 12, 18 to assume a final spaced position as shown in FIG. 3. The distance between the pairs of alternate disc members 12, 18 and 24 is in the neighborhood of from ⅛ inch to ³⁄₁₆ inch as represented by the length of the connecting members 20, 26.

Upon completion of the folding from FIG. 2, the filter 10 is in a generally cylindrical formation and may be incorporated into the tip of a cigarette 30 which has the tobacco portion 32 wrapped by cigarette paper 34 and has the usual fiber or cellulose mouth tip portion 36 which is overwrapped together with the filter 10 with a non-porous paper material which prevents air from being drawn therethrough and causes all of the smoke to come through the filter 10.

In the operation of filter 10, the smoke travels through a baffle-like path as shown in the dotted lines of FIG. 3 since all smoke drawn through tip 36 by the mouth is pulled through the center opening 28 and then must travel through compartments 40 between the adjacent sets of filters disc 12, 18 traveling first to the outer periphery location on disc 12 and then down to the more central openings 19 and disc 18 and through another chamber 40 and thence back up again closer to the outer periphery in disc member 12 through opening 16 and so on until the smoke travels through the final opening 28 through the tip 36 then to the mouth.

The travel of the smoke in the foregoing pattern causes much of the harmful tobacco impurities, particles and tars to be collected in the filter members in the openings 16, 19, as well as on the faces thereof as well as in the chambers 40 therebetween. At the same time, where the smoking is natural and pleasant and the filter is designed so as not to remove so much of the smoke as to cause a cigarette to lack any taste at all.

While I have shown and described a particular embodiment of my filter, and mentioned it in conjunction with cigarettes, it is stated that the filter may be applied to other smoking devices and while I have shown and described a particular embodiment, various alterations, deviations, eliminations, ramifications, elucidations, variations and changes may be made in the embodiment shown and described without departing from the scope of my invention as shown in the appended claims.

I claim:

1. In a smoke filter for a cigarette and other smoker's article:
   (a) an arrangement of spaced and adjacent filter elements arranged about a longitudinal center line, each of said elements being a solid flat member.
   (b) there being at least two spaced filter disc elements, one of said filter elements having a plurality of small spaced openings radially placed closer to the outer periphery thereof and spaced from each other,
   (c) the other of said filter elements having a number of small openings located closer to the center and out of alignment with the openings in (b),
   (d) a non-porous cover over said filter elements which are spaced from each other to form in assembled condition compartment spaces therebetween of small dimensions, whereby said smoke is directed in other than straight lines through compartment spaces.

2. The device claimed in claim 1 wherein there are at least two different pairs of filter elements connected by filter material, each of a pair of said elements being connected at the junction thereof to be substantially superposed one over the other,
   the other of said filter elements being spaced from said first pair to form a compartment therebetween.

3. The device in claim 1, wherein said filter is folded from a flat filter blank made from a flat strip cut to form the filter elements, all of said elements being linked by a flexible connection.

4. In a smoke filter for a cigarette and other smoker's article:
   (a) a substantially symmetrical arrangement of spaced and adjacent filter elements about a longitudinal center line, each of said elements being a disc-like member,
   (b) the first and last disc members on the filter being substantially circular members with substantially circular openings in the center thereof,
   (c) there being at least two other filter disc elements, one of said elements having a plurality of small spaced openings radially placed near the outer periphery thereof and arcuately spaced from each other,
   (d) the other of said filter elements having a fewer number of small openings located closer to the center and out of alignment with the openings in (c),
   (e) a non-porous cover over said filter elements which are spaced from each other to form an assembled condition compartment spaces therebetween of small dimension, whereby said smoke is directed in other than straight lines through compartment spaces.

5. The device claimed in claim 4 wherein there are at least two different pairs of filter elements connected by filter material, each of a pair of said elements being connected at the junction thereof to be substantially superposed one over the other,
   the other of said filter elements being spaced from said first pair to form a compartment therebetween.

6. In a smoke filter for a cigarette and other smoker's article:
   (a) a substantially symmetrical arrangement of spaced and adjacent filter elements placed about a longitudinal center line, each of said elements being a disc-like member,
   (b) the first and last disc members on the filter being substantially circular members with openings therein,
   (c) there being at least two other filter disc elements, one of said elements having a plurality of small spaced openings radially placed near the outer periphery thereof and arcuately spaced from each other,
   (d) the other of said filter elements having a fewer number of small openings located closer to the center and out of alignment with the openings in (c), and
   (e) a non-porous cover over said filter elements which are spaced from each other to form in assembled condition compartment spaces therebetween of small dimension, whereby said smoke is directed in other than straight lines through compartment spaces.

7. The device claimed in claim 6 wherein there are at least two different pairs of filter elements connected by filter material, each pair of said elements being identical and connected at the junction thereof to be substantially superposed one over the other,
   the other of said filter elements being spaced from said first pair by a connection thereto to form a compartment therebetween.

8. The device in claim 6, wherein said filter is folded from a flat filter blank made from a flat strip cut to form the filter elements, are of said elements being linked by flexible connection.

9. In a smoke filter for a cigarette and other smoker's article:
   (a) a substantially symmetrical arrangement of spaced and adjacent filter elements about a longitudinal center line, each of said elements being a disc-like member,
   (b) the first and last disc members on the filter being substantially circular members with substantially circular openings in the center thereof,
   (c) there being at least two other filter disc elements, one of said elements having a plurality of small spaced openings radially placed near the outer periphery thereof and arcuately spaced from each other,
(d) the other of said filter elements having a fewer number of small openings located closer to the center and out of alignment with the openings in (c),
(e) a non-porous cover over said filter elements which are spaced from each other to form in assembled condition compartment spaces therebetween of small dimension, whereby said smoke is directed in other than straight lines through compartment spaces.

10. The device claimed in claim 9 wherein there are at least two different pairs of filter elements connected by filter material, each of a pair of said elements being connected at the junction thereof to be substantially superposed one over the other, the other of said filter elements being spaced from said first pair to form a compartment therebetween.

References Cited

UNITED STATES PATENTS

| 2,728,346 | 12/1955 | Crawford | 131—10.5 |
| 3,292,635 | 12/1966 | Kolodny | 131—10.5 |

FOREIGN PATENTS

| 2,980 | 1884 | Great Britain. |
| 522,764 | 4/1955 | Italy. |

LUCIE H. LAUDENSLAGER, *Primary Examiner.*